(12) United States Patent
Vahidsafa et al.

(10) Patent No.: US 9,645,903 B2
(45) Date of Patent: May 9, 2017

(54) MANAGING FAILED MEMORY MODULES

(71) Applicant: Oracle International Corporation, Redwood Shores, CA (US)

(72) Inventors: Ali Vahidsafa, Palo Alto, CA (US); Connie Wai Mun Cheung, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 142 days.

(21) Appl. No.: 14/675,271

(22) Filed: Mar. 31, 2015

(65) Prior Publication Data

US 2015/0278053 A1   Oct. 1, 2015

Related U.S. Application Data

(60) Provisional application No. 61/973,107, filed on Mar. 31, 2014.

(51) Int. Cl.
| | | |
|---|---|---|
| *G06F 11/00* | (2006.01) | |
| *G06F 11/20* | (2006.01) | |
| *G06F 12/1036* | (2016.01) | |
| *G06F 3/06* | (2006.01) | |
| *G06F 12/06* | (2006.01) | |

(52) U.S. Cl.
CPC ........ *G06F 11/2094* (2013.01); *G06F 3/0647* (2013.01); *G06F 11/20* (2013.01); *G06F 11/2069* (2013.01); *G06F 12/0646* (2013.01); *G06F 12/1036* (2013.01); *G06F 2212/656* (2013.01)

(58) Field of Classification Search
CPC . G06F 11/203; G06F 11/2069; G06F 11/2094
USPC ...................................................... 714/6.32
See application file for complete search history.

(56) References Cited

U.S. PATENT DOCUMENTS

| | | | | |
|---|---|---|---|---|
| 7,158,990 B1* | 1/2007 | Guo | .................... | G06F 17/2247 |
| 7,603,593 B2* | 10/2009 | Iaculo | .................... | G11C 29/76 |
| | | | | 714/710 |
| 8,201,024 B2* | 6/2012 | Burger | .................. | G06F 11/073 |
| | | | | 711/206 |
| 8,417,961 B2* | 4/2013 | Olson | ................. | H03M 13/158 |
| | | | | 712/200 |
| 8,527,559 B2* | 9/2013 | Ylonen | ............... | G06F 12/0269 |
| | | | | 707/813 |
| 9,003,149 B2* | 4/2015 | Kathmann | ............ | G06F 3/0607 |
| | | | | 711/165 |
| 9,032,244 B2* | 5/2015 | Strauss | ............... | G06F 12/0246 |
| | | | | 714/6.13 |
| 9,136,014 B2* | 9/2015 | Yen | ........................ | G11C 29/00 |
| 9,317,214 B2* | 4/2016 | Kolvick | ................ | G06F 3/0647 |
| 2007/0016754 A1* | 1/2007 | Testardi | ................ | G06F 3/0611 |
| | | | | 711/206 |

* cited by examiner

*Primary Examiner* — Elmira Mehrmanesh
(74) *Attorney, Agent, or Firm* — Osha Liang LLP

(57) ABSTRACT

A method for managing a failed memory module, including: receiving a first request to access a first memory address; identifying a memory module identifier (ID) from an end bit segment of the first memory address in the first request; generating, based on the memory module ID matching the failed memory module, a first revised memory address from the first memory address; and sending the first request with the first revised memory address to a memory controller for interpretation.

18 Claims, 7 Drawing Sheets

MANAGING FAILED MEMORY MODULES

CROSS-REFERENCE TO RELATED APPLICATIONS

This application claims priority under 35 U.S.C. §119(e) to U.S. Provisional Patent Application Ser. No. 61/973,107 filed on Mar. 31, 2014. Accordingly, U.S. Provisional Patent Application Ser. No. 61/973,107 is hereby incorporated by reference in its entirety.

BACKGROUND

Modern day computing devices include multiple memory modules (MMs). These MMs are often set up in fine-grain interleave mode. Upon predicting a failure of a MM, it may be necessary to de-configure both the failed MM and other MMs, which would result in a significant performance drop. Users would prefer to de-configure the failed MM while avoiding a significant drop in performance.

SUMMARY

In general, in one aspect, the invention relates to a method for managing a failed memory module. The method comprises: receiving a first request to access a first memory address; identifying a memory module identifier (ID) from an end bit segment of the first memory address in the first request; generating, based on the memory module ID matching the failed memory module, a first revised memory address from the first memory address; and sending the first request with the first revised memory address to a memory controller for interpretation.

In general, in one aspect, the invention relates to a system for managing a failed memory module. The system comprises: a plurality of interleaved memory modules including the failed memory module; a user application configured to issue a request to access a memory address; a coherence ordering unit (COU) configured to: identifying a memory module identifier (ID) from an end bit segment of the memory address in the request; generating, based on the memory module ID matching the failed memory module, a revised memory address from the memory address; and send the request with the revised memory address; and a memory controller unit connected to the COU and configured to interpret the revised memory address.

In general, in one aspect, the invention relates to a system for managing a failed memory module. The system comprises: a plurality of interleaved memory modules including the failed memory module; an operating system configured to: detect failure of the failure memory module, wherein the failure memory module has N entries; vacate a region of memory of size N distributed across the plurality of interleaved memory modules; and initiate a migration from the failed memory module to the region of memory; a user application configured to issue a request to access a memory address; a coherence ordering unit (COU) comprising a barrier pointer referencing a barrier address and configured to: identify a memory module identifier (ID) from an end bit segment of the memory address in the request; determine, by comparing the memory address with the barrier pointer, that the memory address is located on a migrated side of the barrier address; generate, based on the memory module ID matching the failed memory module and the memory address being located on the migrated side, a revised memory address from the memory address; and send the request with the revised memory address; and a memory controller unit connected to the COU and configured to interpret the revised memory address.

Other aspects of the invention will be apparent from the following description and the appended claims.

DETAILED DESCRIPTION

Figure 1:
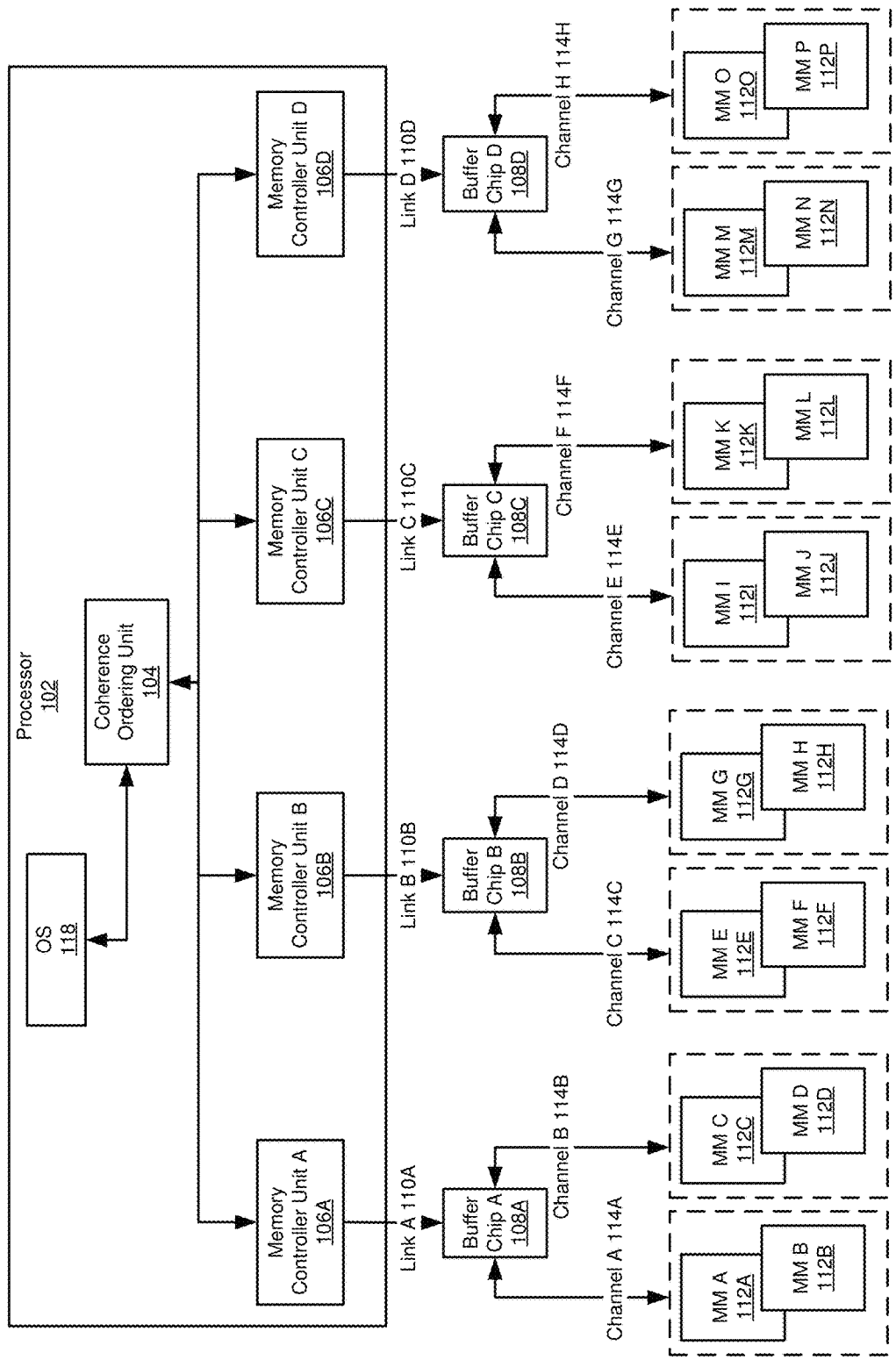
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for managing a failed memory module (MM) in a group of interleaved MMs. Specifically, upon detecting the failure of the MM, a memory region is vacated. Subsequent access requests for the failed MM may be remapped to the vacated memory region. The remapping may be dependent on a barrier pointer, which tracks locations in the failed MM that have, and have not, been relocated to the vacated memory region.

FIG. 1 shows a system in accordance with one or more embodiments of the invention. As shown in FIG. 1, the system includes a processor (102), one or more buffer chips (e.g., buffer chip A (108A), buffer chip B (108B), buffer chip C (108C), buffer chip D (108D)), and one or more memory modules (MMs) (e.g., MM A (112A), MM B (112B), MM C (112C), MM D (112D), MM E (112E), MM F (112F), MM G (112G), MM H (112H), MM I (112I), MM J (112J), MM K (112K), MM L (112L), MM M (112M), MM N (112N), MM O (112O), MM P (112P)). Each component is described below.

In one or more embodiments of the invention, the multiple MMs use an interleaved memory addressing scheme. In other words, sequential addresses are located in different MMs. Each MM has a MM identifier that uniquely identifies the MM. One or more of the MMs may be a dual in-line memory module (DIMM). In one or more embodiments of the invention, the address specifies both the MM and the location (e.g., row) within the MM. For example, the end bit segment may identify the MM (i.e., the end bit segment is the MM identifier), while the remaining bits identify an address (e.g., a row or cache line) within the MM. For example, suppose a hexadecimal (hex) address is 0A3 (0A3 in binary=0000 1010 0011) in a system with 16 MMs. In this example, since the example system has 16 or $2^4$ MMs, the end bit segment corresponds to the final four bits (0011). The MM is identified by the last four bits, while the row of the MM is identified by the remaining bits which are 0A. Accordingly, address A03 is in MM number 3, in row A0.

The following example illustrates how the memory is interleaved in the different MMs based on the interleaved addressing scheme described above. Suppose four MMs form an interleaved memory and there are four write requests to four sequential hex addresses: 000, 001, 002, 003. The first write is allocated to row 00 of MM 0, the second write is allocated to row 00 of MM 1, the third write is allocated to row 00 of MM 2, and the fourth write is allocated to row 00 of MM 3. The four write requests are not allocated to the same MM when the four MMs are interleaved. Rather, as shown in the example, sequential addresses are located in different MMs.

A MM may fail at any time. Following the failure of the MM, or upon determining that the MM will likely fail, it may be necessary to select a new set of addresses within the remaining (i.e., still operational) MMs, and relocate the content in the failed MM to this new set of addresses. In one or more embodiments of the invention, the new set of addresses is referred to as a region of memory, and the size of the region of memory (e.g., number of locations/entries) is equal to the size of the failed MM.

In one or more embodiments of the invention, processor (102) may include one or more memory controller units (MCUs) (e.g., memory controller unit A (106A), memory controller unit B (106B), memory controller unit C (106C), memory controller unit D (106D)). The MCUs (106A-106D) include circuitry necessary to interpret a specified address and identify the corresponding entry/location in the appropriate MM that corresponds to the specified address. The MCUs (106A-106D) also include circuitry necessary to read data from and/or write data to the identified entry/location in the appropriate MM.

In one or more embodiments of the invention, the MCUs (106A-106D) include functionality to vacate a region of memory distributed across the multiple memory modules. The region of memory may be vacated following a determination that a MM has, or is likely to, fail. The region of memory may correspond to the top N addresses of the multiple interleaved MMs, where N is the size of the failed MM. Vacating the region of memory may include writing back the content stored in the region of memory to main memory or disk. In one or more embodiments of the invention, migration of the content in the failed MM to the region of memory is initiated after the top N addresses have been vacated.

In one or more embodiments of the invention, the MCUs are operatively connected to one or more buffer chips (e.g., buffer chip A (108A), buffer chip B (108B), buffer chip C (108C), buffer chip D (108D)) via one or more links (e.g., link A (110A), link B (110B), link C (110C), link D (110D)). In one or more embodiments of the invention, the buffer chips then connect to a set of two MMs via one or more channels (e.g., channel A (114A), channel B (114B), channel C (114C), channel D (114D), channel E (114E), channel F (114F), channel G (114G), channel H (114H)). Alternatively, in one or more embodiments of the invention, the MCUs may connect directly to the MMs.

In one or more embodiments of the invention, processor (102) includes the COU (104). The COU (104) is a hardware unit in the processor (102) that sees all (or most) memory traffic. The COU (104) includes a barrier pointer. The barrier pointer partitions all the addresses referring to locations in the failed MM into a set of migrated addresses and a set of un-migrated addresses. For example, every address "above" the address referenced by barrier pointer may be considered a migrated address. The content previously stored in these locations has been relocated to the vacated memory region. Every address "below" the address referenced by the barrier pointer may be considered an un-migrated address. Content in the un-migrated addresses has not yet been relocated to the vacated memory region. The address referenced by the barrier pointer may be referred to as the barrier address. The barrier address is considered an un-migrated address. In one or more embodiments, the barrier pointer is implemented as a register.

In one or more embodiments, the COU (104) has functionality to receive an access request for any memory location within the MMs. These requests may originate from a user application (not shown) executing on the processor (102). An access request may correspond to a read only access request, a write only access request, a read/write access request, or any request to manipulate or examine data in a MM.

In one or more embodiments of the invention, the COU (104) includes functionality to identify/extract the MM identifier from the end bit segment of the address in the access request. The COU (104) further includes functionality to: (i) determine whether the extracted MM identifier belongs to the failed MM; and (ii) compare the address with the barrier address referenced by the barrier pointer to determine whether the address in the access request falls within the set of un-migrated addresses or within the set of migrated addresses. Further still, the COU (104) includes functionality to update/revise the memory address (discussed below) in the access request when the address falls within the set of migrated addresses.

In one or more embodiments of the invention, when the access request is a write only or read/write request and the memory address specified in the access request is the barrier address, the COU (104) includes functionality to update/revise the memory address (discussed below) in the access request and to update the barrier pointer to reference the next un-migrated memory address of the failed MM. Those skilled in the art, having the benefit of this detailed description, will appreciate that updating the barrier pointer may include incrementing or decrementing the barrier pointer.

In one or more embodiments of the invention, a scrubber application (not shown) includes functionality to force the barrier pointer to update if such an update has not occurred within a predetermined time window. The scrubber application may be separate from the user application that is traditionally issuing the access requests. When the barrier pointer is updated to reference a new barrier address, the scrubber application initiates a timer or time window. If the barrier pointer continues to reference the same barrier address for a predetermined time window (e.g., 5 msecs, 10 seconds, 3 cycles, etc.), the scrubber is triggered to issue a read request for the content (i.e., data value) stored in the location referenced by the barrier address, and then issue a write request with the data value for the location reference by the barrier address. As discussed above, this will force the COU (104) to update the barrier pointer to reference another new barrier address.

In one or more embodiments of the invention, the operating system (118) executes on the processor (102). The operating system (118) is configured to determine that a MM has failed or is likely to fail. For example, the operating system (118) may execute one or more error detection schemes on data values retrieved from the MM in response to access requests. If a high number of errors are detected (e.g., the number of errors exceeds a predefined thresholds, the number of errors is statistically significant, etc.), the operating system (118) may deem the MM as failed or likely to fail. This triggers the memory region to be vacated and the subsequent migration of the content in the failed MM to the memory region.

Although FIG. 1 shows 16 MMs, $2^N$ MMs may be used without departing from the invention. Further, while FIG. 1 shows a configuration of components, other configurations may be used without departing from the scope of the invention. For example, various components may be combined to create a single component. As another example, the functionality performed by a single component may be performed by two or more components.

Figure 2:
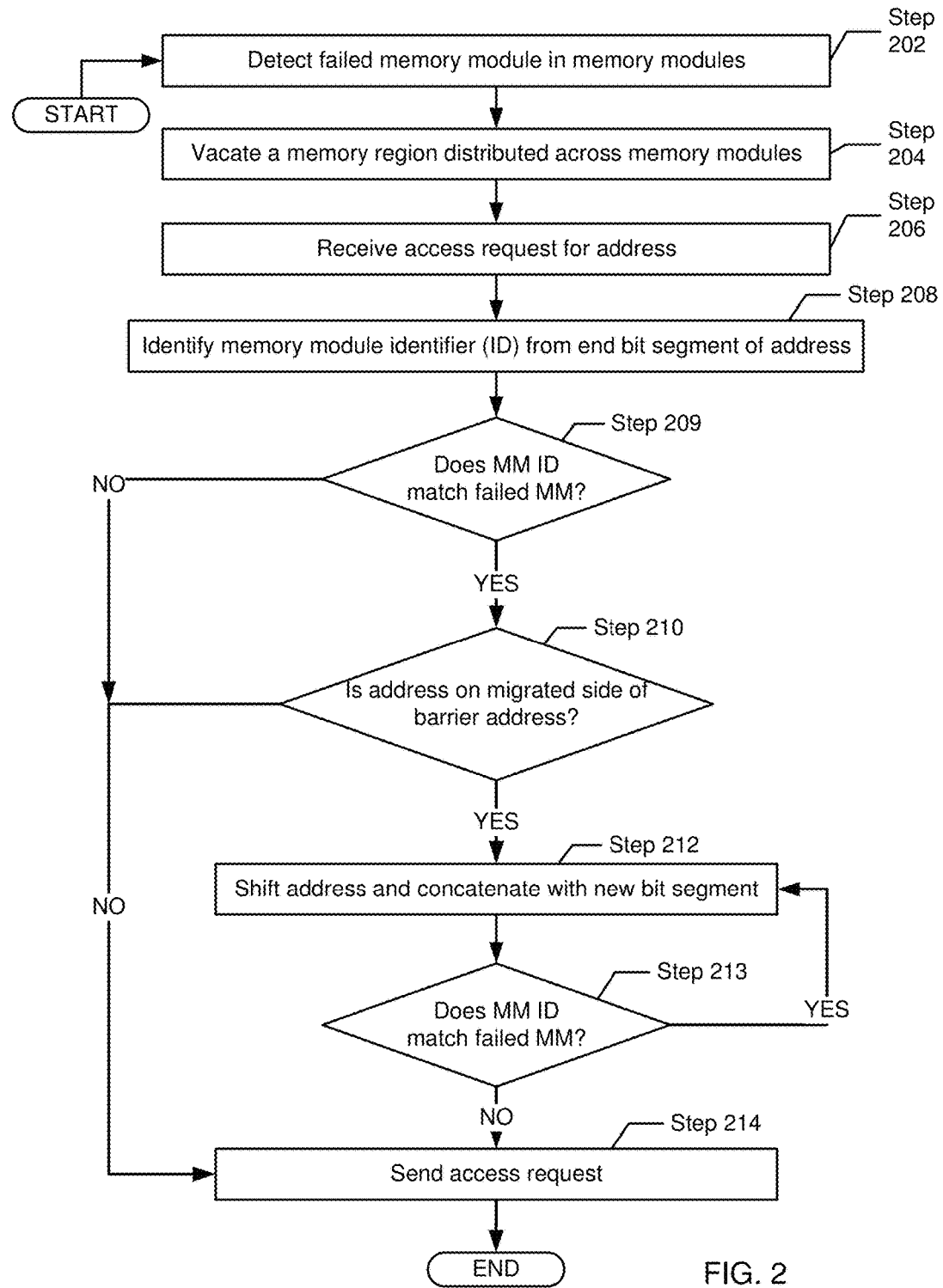
FIG. 2 and FIG. 3 show flowcharts in accordance with one or more embodiments of the invention.

FIG. 2 shows a flowchart in accordance with one or more embodiments of the invention. One or more of the steps shown in FIG. 2 may be executed by the components shown in FIG. 1 (e.g., operating system (118), COU (104), etc.). While the various steps in these flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Initially, a failed MM in a group of MMs is detected (Step 202). As discussed above, the failed MM may be detected by the operating system. Specifically, the operating system may execute one or more error detection schemes on data items being retrieved from the MM in response to read or read/write requests from a user application. If the number of errors is statistically significant and/or exceeds a predetermined threshold, the MM is deemed as failed or likely to fail. The multiple MMs use an interleaved memory addressing scheme. In other words, sequential addresses are located in different MMs.

In Step 204, a memory region distributed across the memory modules is vacated. This vacated memory region may eventually be the new storage location for the content currently stored in the failed memory module. In one or more embodiments of the invention, the memory region corresponds to the top N addresses of the addressing scheme, where N is the number of locations in the failed MM. For example, if there are 16 memory modules of equal sizes, the contents of the top 1/16 of the addresses (i.e. highest addresses) distributed across the memory modules may be returned to main memory. Then the top 1/16 is free to allocate the addresses of the failed memory module as the size of the failed memory module is 1/16 (i.e., the failed memory module is one memory module out of 16 memory modules).

In Step 206, an access request for an address is received in accordance with one or more embodiments of the invention. The access request may be issued by a user application. The access request may correspond to a read request, a write request, or a read/write request.

In Step 208, a memory module identifier (ID) is identified from an end bit segment of the address in the access request in accordance with one or more embodiments of the invention. For example, in the case 16 memory modules, the module identifier (ID) may be the last four bits of the address.

In Step 209, it is determined whether the identified MM ID matches the failed MM. When it is determined that the MM ID matches the failed MM, the process proceeds to Step 210. When it is determined that the MM ID does not match the failed MM, the process proceeds to Step 214.

In Step 210, a determination is made whether the requested address is on the migrated side of the barrier address. As discussed above, the barrier pointer references the barrier address and separates/groups the set of addresses referring to locations in the failed MM into a set of migrated address and a set of un-migrated addresses. For example, the set of migrated addresses may be the addresses that are "below" (i.e., smaller than) the barrier address referenced by the barrier pointer. In one or more embodiments, determining whether the requested address is on the migrated side of the barrier address includes comparing the address in the access request with the barrier pointer. When it is determined that the requested address is on migrated side of the barrier pointer, the process proceeds to Step 212. When it is determined that the requested address is not on the migrated side of the barrier address (i.e., the requested address is on the un-migrated side of the barrier address), the process may proceed to Step 214, where the access request is sent to the MCUs for interpretation.

In Step 212, a revised memory address is generated. The revised memory address is for a location in the memory region that was previously vacated in response to the failure (or predicted failure) of the MM. In one or more embodiments of the invention, the updated memory address is generated by shifting the address, and concatenating the shifted address with a new bit segment. The shifting effectively discards the end bit segment from the address. The new bit segment has the same cardinality as the end bit segment. In one or more embodiments, the new bit segment is all ones (e.g., "1").

In Step 213, it is determined if the MM ID of the updated address (i.e., end bit segment of updated address) matches the failed MM. When it is determined that the MM ID of the updated address matches the failed MM, the process returns to Step 212 (i.e., the process is recursive). If the MM ID of the updated address does not correspond to the failed MM, the access request with the updated address is sent to one or more MCUs for interpretation (Step 214).

Figure 3:
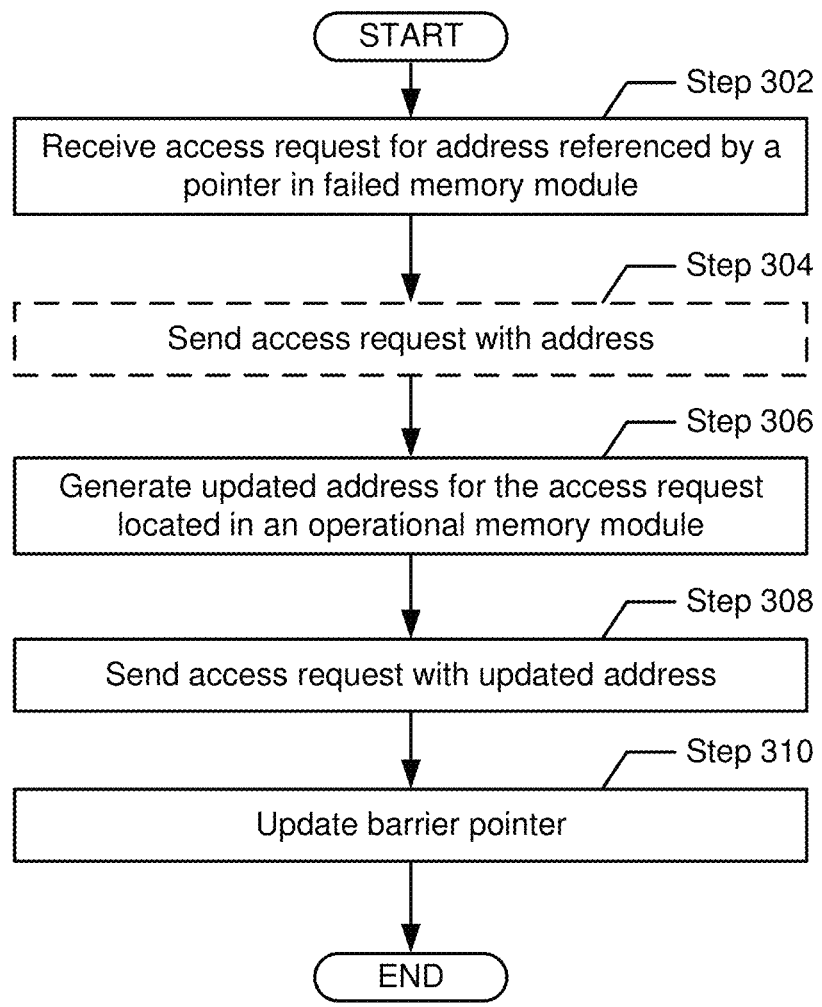

FIG. 3 shows a flowchart in accordance with one or more embodiments of the invention. One or more of the steps shown in FIG. 3 may be executed by the components shown in FIG. 1 (e.g., operating system (118), COU (104), etc.). While the various steps in these flowchart are presented and described sequentially, one of ordinary skill will appreciate that some or all of the steps may be executed in different orders, may be combined or omitted, and some or all of the steps may be executed in parallel.

Initially, an access request is received (Step 302). The access request specifies the barrier address referenced by a barrier pointer. The access request may be received following Step 209, discussed above in reference to FIG. 2. As discussed above, the barrier address references a location in a failed MM. The access request may be issued by a user application and/or a scrubber application (discussed above).

In Step 304, if the access request is a read-only access request or read/write access request, the access request with the address is sent to the MCUs for interpretation in accordance with one or more embodiments of the invention. In other words, Step 304 is optional and might not be used if the request is a write only access request.

In Step 306, an updated address located in the vacated memory region is generated in accordance with one or more embodiments of the invention. The updated address may be generated using the same shifting and concatenation steps discussed above in reference to FIG. 2.

In Step 308, the access request with the updated address is sent to the MCUs for interpretation in accordance with one or more embodiments of the invention.

In Step 310, the barrier pointer is updated to reference a new barrier address. The barrier pointer may be updated by incrementing the barrier pointer, decrementing the barrier pointer, or performing any logical operation to traverse each address (e.g., row, cache line) within the memory module. In one or more embodiments of the invention, because of the interleaving, the barrier pointer is incremented by $2^K$, where $2^K$ is the number of MMs (i.e., the cardinality of MMs). In one or more embodiments of the invention, the COU (104) maintains a data structure (e.g., list, array, etc.) with all of the memory addresses in the failed MM. In such embodiments, the barrier pointer may be incremented (or decremented) by one to reference the next memory address in the data structure.

Figure 4A:
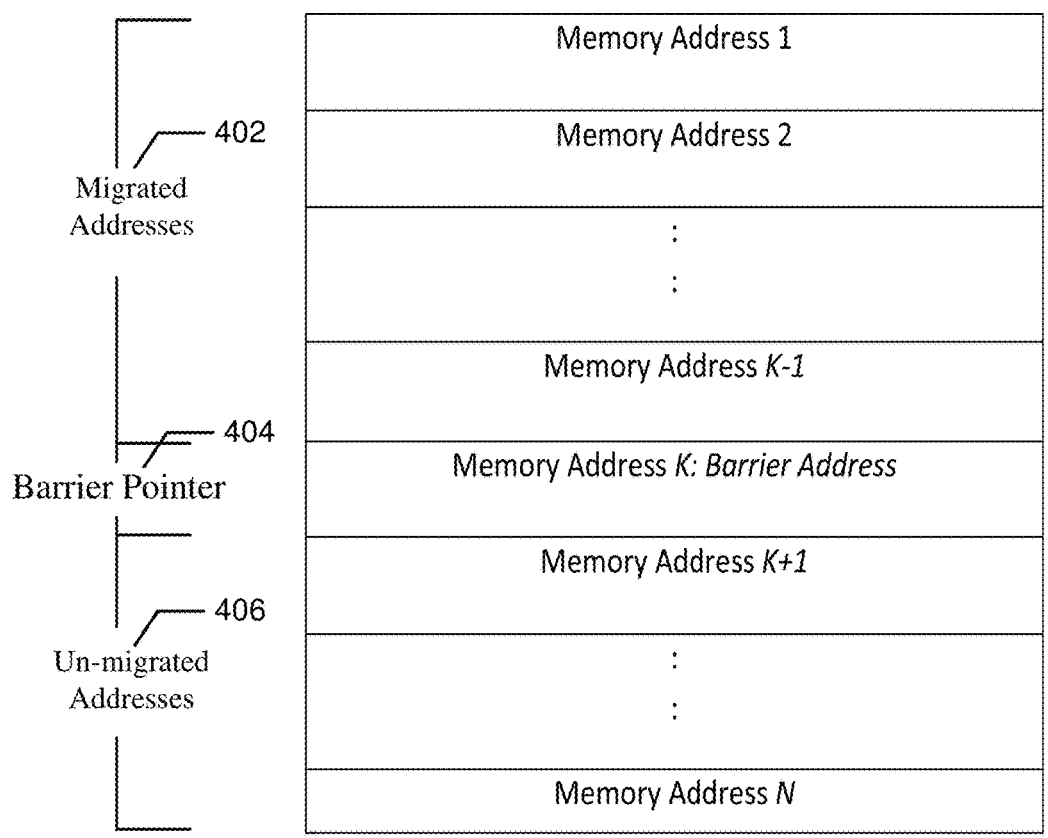
FIGS. 4A, 4B, and 4C show examples in accordance with one or more embodiments of the invention.

FIG. 4A shows an example of the migration determination process. Specifically, FIG. 4A shows a set of memory addresses (MAs): MA 1 to MA N. Assume, MA K is the barrier address referenced by a barrier pointer (404). Accordingly, MA 1 through MA K−1 are migrated (402), while MA K+1 through MA N are un-migrated (406).

Now assume a first access request (R1) is received for MA 2. The address specified in R1 is compared to the barrier address (MA K) and it is determined that the specified address is on the migrated side of the barrier address. Accordingly, R1 is revised (e.g., shift and concatenate), and sent to the MCUs for interpretation. The barrier pointer continues to reference MA K.

Now Suppose a second access request (R2) is received and specifies MA K. R2 is a write request. The address specified in R2 is compared to the barrier address (MA K). In response to a match, R2 is revised (e.g., shift and concatenate) and sent to the MCUs for interpretation. Moreover, the barrier pointer is incremented to a new location, MA K+1, which becomes the new barrier address.

Figure 4B:
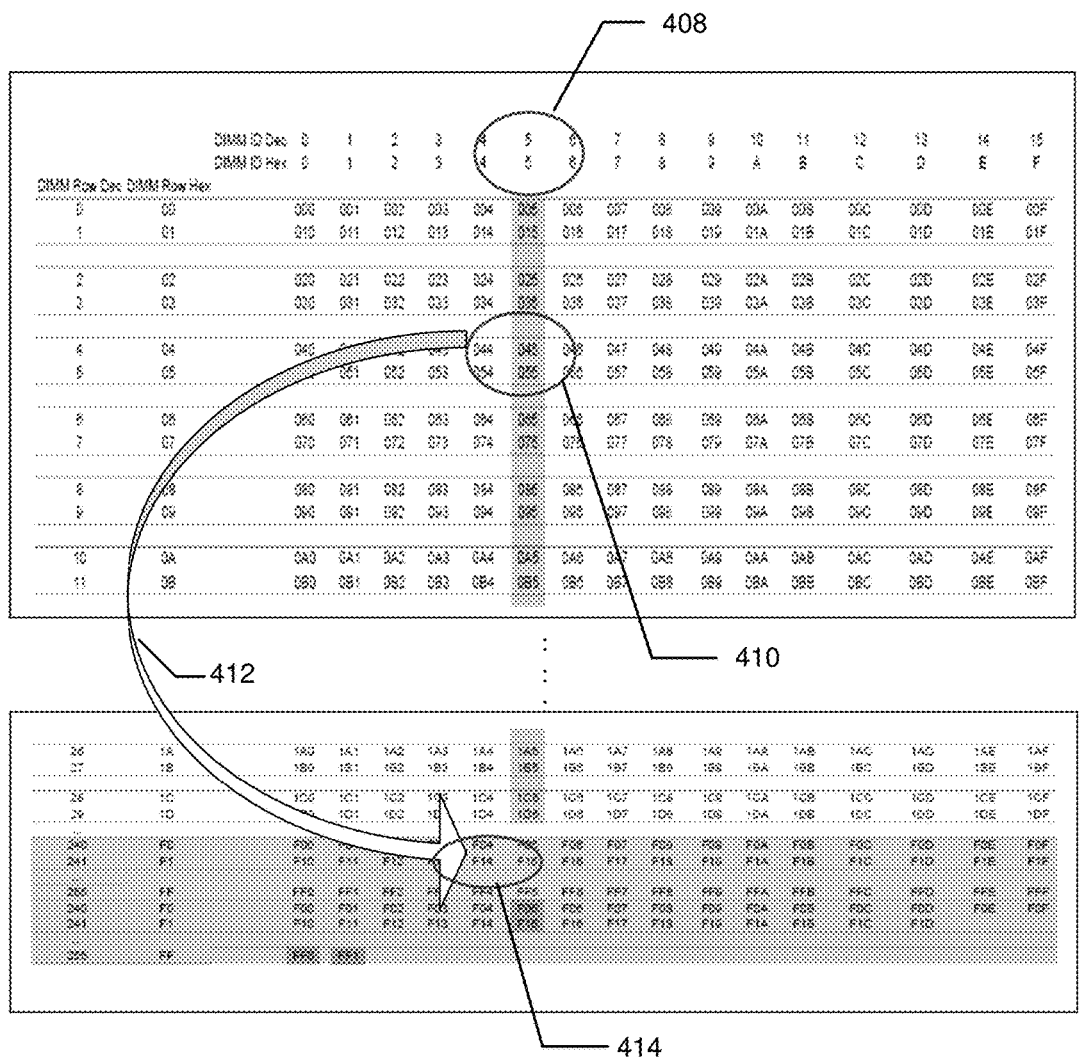

FIG. 4B shows an example of the shifting and concatenating process. Assume there exists 16 DIMMs: DIMM 0 through DIMM 15. Moreover, assume that DIMM 5 (408) is predicted to fail. The COU receives an access request to access hexadecimal (hex) address 045 (410). Hex address 045 is made up of 3 bit segments (i.e. 5 hex is a first bit segment, 4 Hex is a second bit segment, and 0 hex is a third bit segment). The MM ID is identified from the end bit segment, which in this example is 5 (i.e., first bit segment). The MM ID matches the failed MM. The hex address is shifted to the right (i.e., the first bit segment is discarded) and an F hex value is concatenated to the left (412), resulting in hex address F04 (414). The MM ID is now identified from the new end bit segment, which in this example is 4 (i.e., shifted second bit segment). As the MM ID does not match the failed MM, the access request is sent to the MCUs for interpretation. This new address (hex F04) corresponds to a location in the vacated memory region.

Figure 4C:
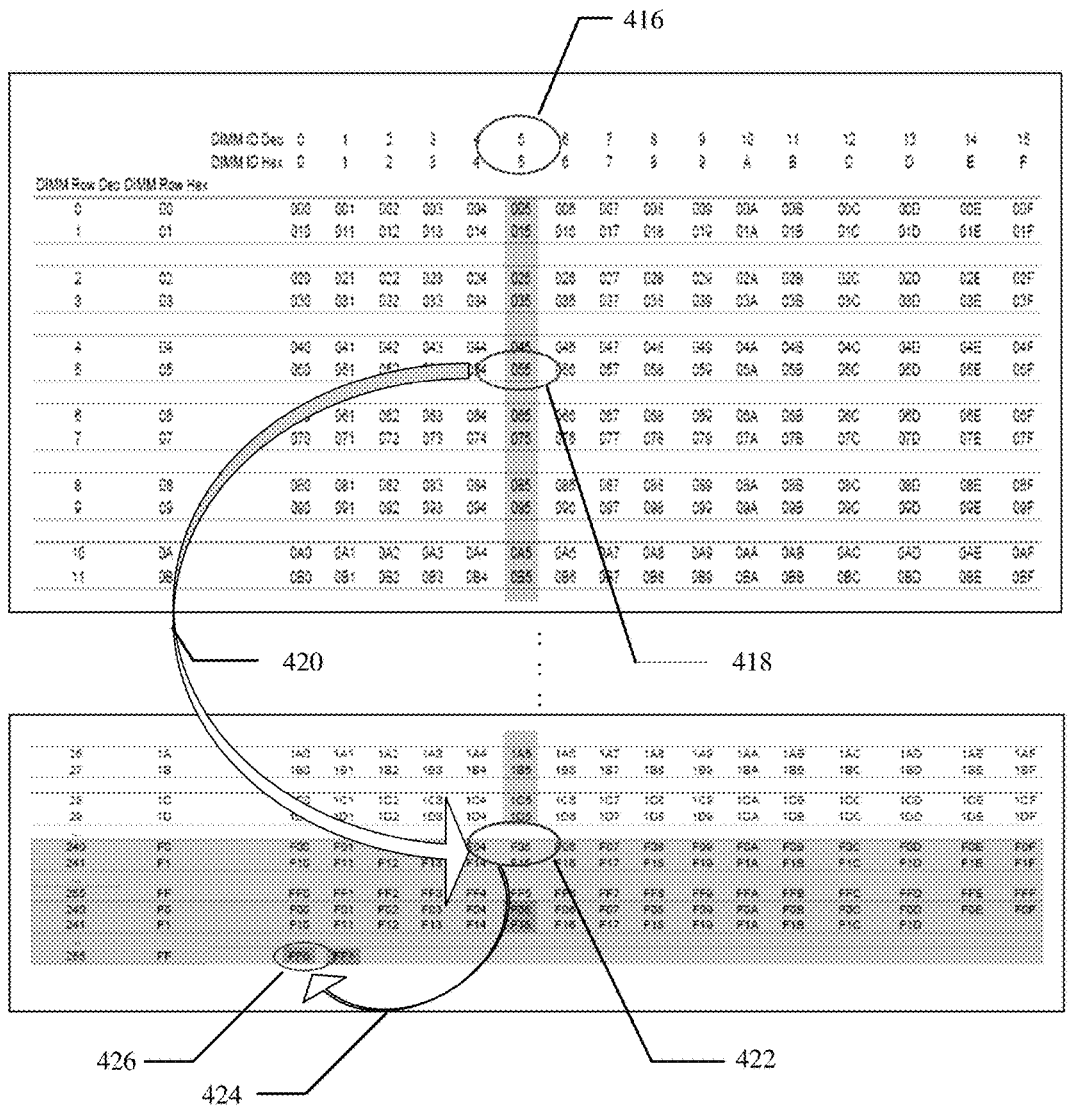

FIG. 4C shows an example of the recursive shift and concatenation process. Once again, assume there exists 16 DIMMs: DIMM 0 through DIMM 15. Moreover, assume that DIMM 5 (416) is predicted to fail. The COU receives an access request to hex address 055 (418). Hex address 055 is made up of 3 bit segments (i.e. 5 hex is a first bit segment, 5 hex is a second bit segment, and 0 hex is a third bit segment). The MM ID is identified from the end bit segment which in this example is 5 (i.e., first bit segment). The MM ID matches the failed MM. Because the MM ID matches the failed MM, the hex address is shifted to the right (i.e., the first bit segment is discarded), an F hex value is concatenated to the left (420) to output the hex address F05 (422). The MM ID is one again identified from the new end bit segment, which in this example is 5 (i.e., second bit segment). As the MM ID once again matches the failed MM, the hex address is shifted to the right again and an F hex value is again concatenated to the left (424), resulting in hex address FF0 (426). The MM ID is once again identified from the new end bit segment, which in this example is 0 hex (i.e., third bit segment). As the MM ID does not match the failed MM, the access request with the revised address of hex FF0 is sent off for interpretation.

In the above example, the 16 DIMMs are configured in a fine-grain interleave mode. This means that sequential addresses reside in different DIMMs. For example, address 0 is in DIMM 0, address 1 is in DIMM 1, etc. In this configuration, the lowest order parts of the address are used as the DIMM ID, and the rest of the address is used as the row within the DRAM. If the lowest order bits of the address end up selecting the failed DIMM, then it is desirable to remap the rest of address in a manner which distributes the contents of the failed DIMM among the remaining DIMMs in a fine-grain manner. The address transformation is to do right shift until the first bit-segment drops out, while appending ones on the left. The choice of all-ones is because the memory locations which will be the new home of the failed DIMM's contents are at the highest addresses of the remaining DIMMs, and those locations have logic 1 as their left most address bit. Now, the second bit-segment has become the lowest part of the address, and used for DIMM select. However, this bit-segment may also match the failed DIMM ID. So the process of delete on the right and append 1 to the left continues until the rightmost part of the address does not match the failed DIMM ID.

One or more embodiments of the invention may have the following advantages: the ability to de-configure an MM without de-configuring other MMs; the ability to vacate a memory region; the ability to remap access requests to the vacated memory region using a recursive shift and concatenate technique; the ability to use a barrier pointer to partition addresses corresponding to locations in the failed MM into migrated and un-migrates sets; the ability to force the barrier pointer to update using a scrubber application; etc.

Figure 5:
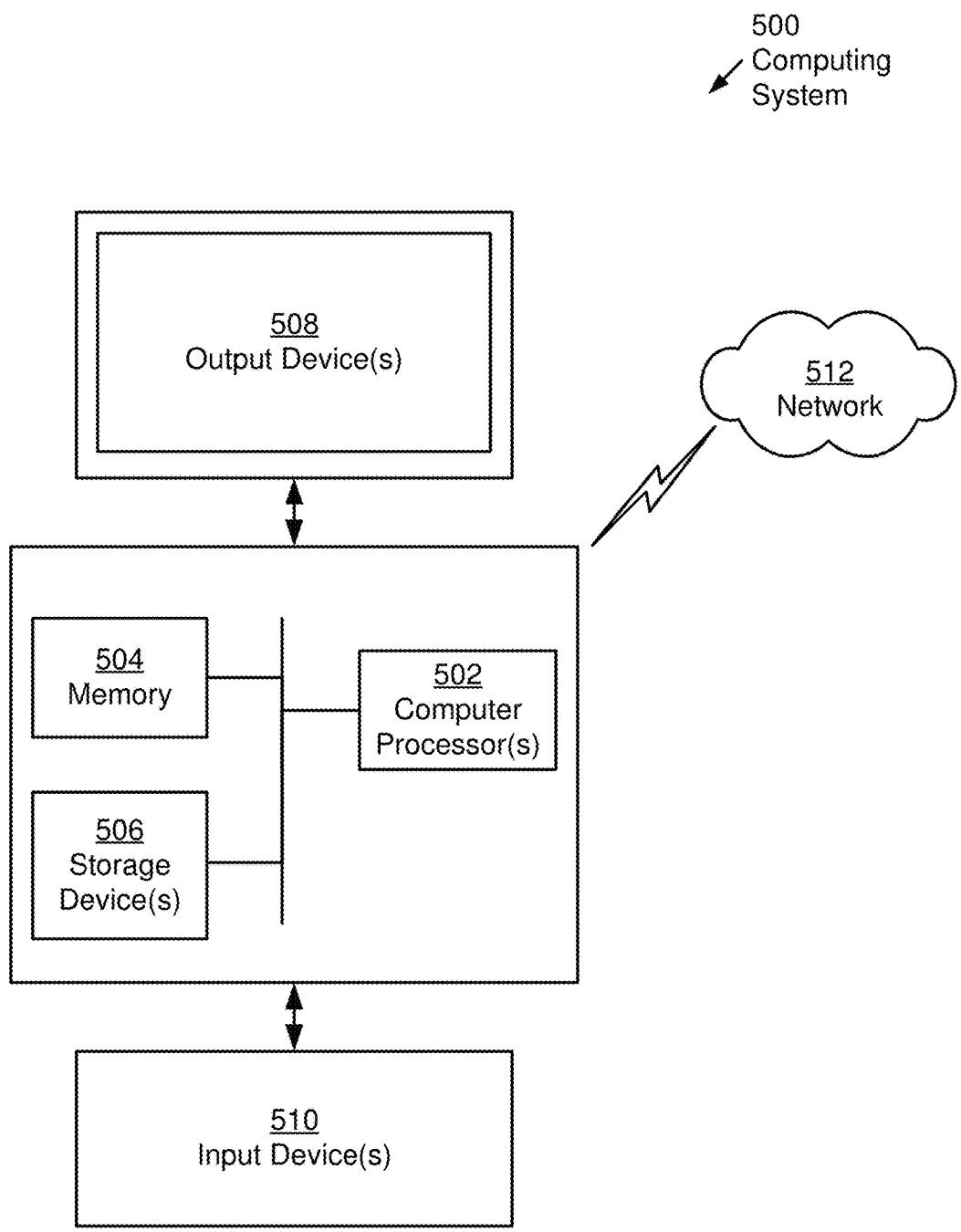
FIG. 5 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (514) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (514). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a failed memory module, comprising:
   detecting failure of the failed memory module;
   vacating a region of memory distributed across a plurality of interleaved memory modules including the failed memory module;
   initiating a migration from the failed memory module to the region of memory;
   receiving a first request to access a first memory address;
   identifying a memory module identifier (ID) from an end bit segment of the first memory address in the first request;
   generating, based on the memory module ID matching the failed memory module, a first revised memory address from the first memory address by:
      shifting the first memory address; and
      concatenating the first memory address with a new bit segment; and
   sending the first request with the first revised memory address to a memory controller for interpretation.

2. The method of claim 1, further comprising:
   identifying a revised memory module identifier (ID) from an end bit segment of the first revised memory address;
   shifting the first revised memory address in response to the revised memory module ID matching the failed memory module; and
   concatenating the first revised memory address with a new bit segment in response to the revised memory module ID matching the failed memory module.

3. The method of claim 1, wherein the failed memory module has N entries, wherein the region of memory is of size N, and wherein N is an integer.

4. The method of claim 1, wherein each bit in the new bit segment is binary 1, and wherein the first revised memory address is located within the region of memory.

5. The method of claim 1, further comprising:
   comparing the first memory address with a barrier pointer referencing a barrier address and separating migrated addresses and un-migrated addresses,
   wherein generating the first revised memory address is further based on the first address being on a migrated side of the barrier pointer.

6. The method of claim 5, further comprising:
   receiving a second request to access a second memory address;
   comparing the second memory address with the barrier pointer; and
   retrieving a value from the failed memory module in response to the second memory address being on an un-migrated side of the barrier pointer.

7. The method of claim 5, further comprising:
   receiving, from a scrubber, a read request for the barrier address;
   sending, in response to the read request, a value from the failed memory module;
   receiving, from the scrubber after sending the value, a write request for the barrier address and comprising the value;
   generating a second revised memory address based on the barrier address, wherein the second revised memory address is located in the region of memory;
   sending the write request comprising the second revised memory address for interpretation; and
   updating the barrier pointer to reference a new barrier address in the failed memory module.

8. The method of claim 7, wherein the plurality of interleaved memory modules has a cardinality of $2^K$, wherein updating the barrier pointer comprises adding $2^K$ to the barrier pointer, and wherein K is an integer.

9. A system for managing a failed memory module, comprising:
   a plurality of interleaved memory modules including the failed memory module;
   an operating system configured to:
      detect failure of the failed memory module;
      vacate a region of memory distributed across a plurality of interleaved memory modules including the failed memory module; and initiate a migration from the failed memory module to the region of memory;
a coherence ordering unit (COU) configured to:
receive a request to access a memory address;
identify a memory module identifier (ID) from an end bit segment of the memory address in the request;
generate, based on the memory module ID matching the failed memory module, a revised memory address from the memory address by:
shifting the first memory address; and
concatenating the first memory address with a new bit segment; and
send the request with the revised memory address; and
a memory controller unit connected to the COU and configured to interpret the revised memory address.

10. The system of claim 9, wherein the COU is further configured to:
identify a revised memory module identifier (ID) from an end bit segment of the revised memory address;
shift the revised memory address in response to the revised memory module ID matching the failed memory module; and
concatenate the revised memory address with a new bit segment in response to the revised memory module ID matching the failed memory module.

11. The system of claim 9, wherein the failed memory module is a dual in-line memory module (DIMM).

12. The system of claim 9, wherein:
the failure memory module has N entries;
the region of memory is of size N; and
N is an integer.

13. The system of claim 9, wherein:
each bit in the new bit segment is binary 1; and
the revised address is located within the region of memory.

14. The system of claim 9, wherein:
the COU comprises a barrier pointer referencing a barrier address and separating migrated addresses and un-migrated addresses;
the COU is further configured to compare the memory address with the barrier pointer; and
generating the revised memory address is further based on the memory address being on a migrated side of the barrier pointer.

15. The system of claim 14, further comprising:
a scrubber connected to the COU and configured to:
issue a read request for the barrier address;
receive a value from the failed memory module in response to the read request; and
issue a write request for the barrier address and comprising the value,
wherein the COU is further configured to update, in response to the write request, the barrier pointer to reference a new barrier address in the failed memory module.

16. The system of claim 15, wherein the plurality of interleaved memory modules has a cardinality of $2^K$, wherein updating the barrier pointer comprises adding $2^K$ to the barrier pointer, and wherein K is an integer.

17. A system for managing a failed memory module, comprising:
a plurality of interleaved memory modules including the failed memory module;
an operating system configured to:
detect failure of the failed memory module, wherein the failure memory module has N entries;
vacate a region of memory of size N distributed across the plurality of interleaved memory modules, wherein N is an integer; and
initiate a migration from the failed memory module to the region of memory;
a user application configured to issue a request to access a memory address;
a coherence ordering unit (COU) comprising a barrier pointer referencing a barrier address and configured to:
identify a memory module identifier (ID) from an end bit segment of the memory address in the request;
determine, by comparing the memory address with the barrier pointer, that the memory address is located on a migrated side of the barrier address;
generate, based on the memory module ID matching the failed memory module and the memory address being located on the migrated side, a revised memory address from the memory address; and
send the request with the revised memory address; and
a memory controller unit connected to the COU and configured to interpret the revised memory address.

18. The system of claim 17, further comprising:
a scrubber connected to the COU and configured to:
issue a read request for the barrier address;
receive a value from the failed memory module in response to the read request; and
issue a write request for the barrier address and comprising the value,
wherein the COU is further configured to update, in response to the write request, the barrier pointer to reference a new barrier address in the failed memory module,
wherein the plurality of interleaved memory modules has a cardinality of $2^K$,
wherein updating the barrier pointer comprises adding $2^K$ to the barrier pointer, and
wherein K is an integer.

* * * * *